Aug. 4, 1931. M. A. ROLLMAN 1,817,583
SADIRON HANDLE
Filed May 25, 1927
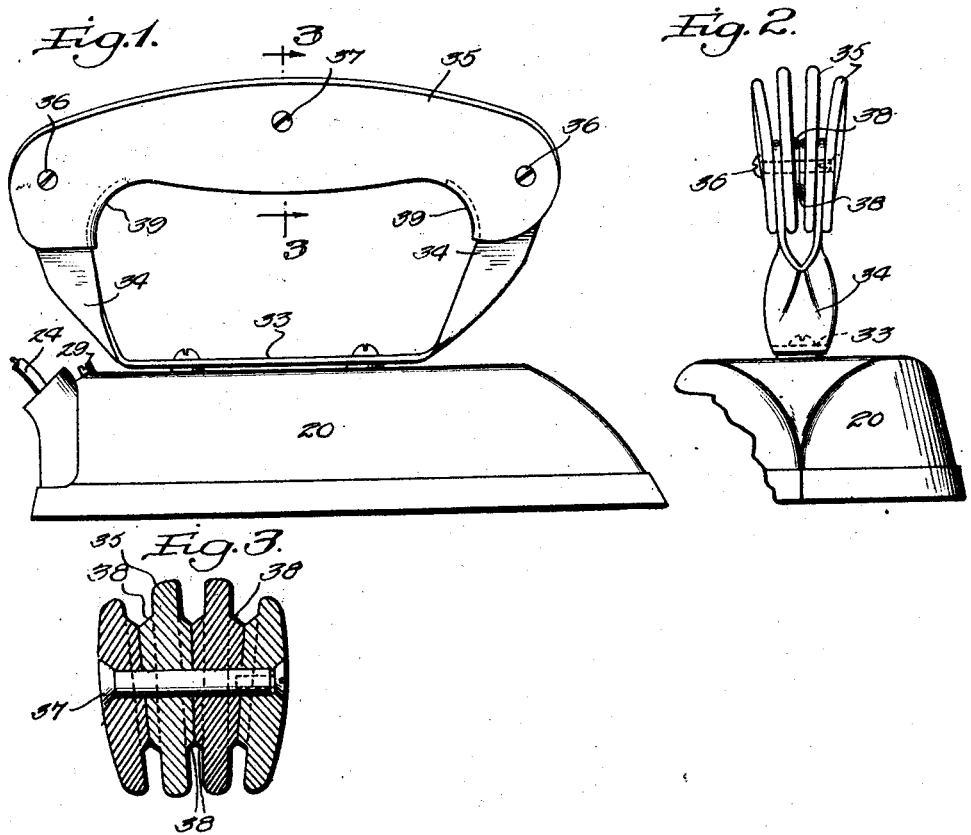
Inventor
M. A. Rollman
Davis & Davis
Attorneys Patented Aug. 4, 1931

1,817,583

UNITED STATES PATENT OFFICE

MICHAEL A. ROLLMAN, OF MOUNT JOY, PENNSYLVANIA

SADIRON HANDLE

Application filed May 25, 1927. Serial No. 194,182.

The object of this invention is to so construct the handle that it will be at all times at sufficiently low temperature to be conveniently handled as more fully hereinafter set forth.

In the accompanying drawings—

Fig. 1 is a side elevation of my improved iron;

Fig. 2 is a front elevation thereof;

Fig. 3 is a transverse section on the line 3—3 of Fig. 1.

Referring to the drawings by reference characters, 20 designates the shell of the iron, 24 the electric conductors and 29 the screw for holding the heating elements of the shell. The handle consists of a metal plate 33 fastened to the top of the shell and having its bifurcated ends bent upwardly to form a pair of upstanding flat-sided arms 34 at each end, these arms being separated. Connecting these upstanding arms is a series of plates 35 made of wood, or other heat-insulating material. The ends of these plates are fastened to the upstanding ends of the arms by means of horizontal screws 36 and they are also connected together, for structural strength, midway their ends by means of another screw 37. These plates are separated from each other by bosses 38 formed at the points where the screws pass through the plates. In this way, a rigid handle is provided and at the same time sufficient ventilation is secured to prevent the handle becoming too hot to comfortably manipulate. At each end, the plates are provided with down-turned ends 39 to form finger-guards, to thus prevent the fingers of the user touching the metal parts 34. The inner edges of these down-turned parts 39 extend inwardly beyond the adjacent edges of the metal parts 34 and these inner edges are concaved for comfort and appearance.

What I claim as new is:

1. A handle for sad irons consisting of a plate fastened to the top side of the iron and having a pair of separated upstanding arms at each end, and a grasping-portion consisting of a plurality of separated plates made of heat-insulating material and having their ends clamped flatwise against the upper ends of said upstanding arms, the central plates lying between said arms.

2. A handle for sad irons whose grasping-portion consists of a plurality of longitudinally-extending flat separated one-piece plates of heat insulating material arranged in vertical planes and fastened together, the ends of said plates having down-turned extensions forming finger-guards, said plates being laterally separated to form air spaces between them open above as well as below for air circulation.

3. A handle for sad irons whose clasping portion consists of a plurality of longitudinally-extending flat plates of heat insulating material arranged in vertical planes and fastened together, said plates being laterally separated to form vertical air passages between them, said passages being open above as well as below to permit free circulation of air between the plates.

4. A handle for sad irons whose clasping portion consists of a plurality of longitudinally-extending plates of insulating material lying side by side and separated from each other to provide air passages between the plates, said passages being open below as well as above, a fastening device at each end of the handle and another one at a point between the ends of the handles, each of said fastening devices extending through all the plates and serving to clamp them together side by side, the plates being provided with bosses adjacent said intermediate fastening device to thus rigidly space the plates, said handle being connected to the body of the iron by upstanding arms carried by said body, the upper ends of said arms being clamped between adjacent plates.

In testimony whereof I hereunto affix my signature.

MICHAEL A. ROLLMAN.